UNITED STATES PATENT OFFICE.

ROBERT HAWKINS AND ALBERT ADDISON HILL, OF BEALLSVILLE, PA.

IMPROVEMENT IN MEDICAL COMPOUNDS FOR KIDNEY DISEASES.

Specification forming part of Letters Patent No. 117,537, dated August 1, 1871.

*To all whom it may concern:*

Be it known that we, ROBERT HAWKINS and ALBERT ADDISON HILL, of Beallsville, in the county of Washington and State of Pennsylvania, have invented a new and useful Improvement in Medical Compound; and we do hereby declare that the following is a full, clear, and exact description thereof, which will enable others skilled in the art to make and use the same.

In carrying out our invention or discovery, we make use of one ounce pulverized flesh-leek; pulverized dandelion, two drams; pulverized wild senna, two drams. One and one-half table-spoonful of the above mixture is put into one pint of boiling water and steeped ten minutes; then add pulverized white sugar sufficient to make it palatable.

The medicine thus formed is a remedy for gravel and stricture, and is used with the best results in diseases of the kidneys, bladder, and liver. It reduces inflammation in those organs and acts favorably upon the stomach.

Having described our invention, what we claim as new, and desire to secure by Letters Patent, is—

The above-described medical compound, substantially as set forth.

ROBERT HAWKINS.
    ALBERT ADDISON HILL.

Witnesses:
  S. R. BOROM,
  THOS. T. HILL.